(No Model.)

T. A. EDISON.
System of Electric Lighting.

No. 239,147.    Patented March 22, 1881.

Witnesses:
O. D. Mott
E. Berggren.

Inventor:
Thos. A. Edison,
per Dyer and Wilber,
Attorneys.

UNITED STATES PATENT OFFICE.

THOMAS A. EDISON, OF MENLO PARK, NEW JERSEY.

SYSTEM OF ELECTRIC LIGHTING.

SPECIFICATION forming part of Letters Patent No. 239,147, dated March 22, 1881.

Application filed August 9, 1880. (No model.)

*To all whom it may concern:*

Be it known that I, THOMAS A. EDISON, of Menlo Park, in the county of Middlesex and State of New Jersey, have invented a new and useful Improvement in Systems of Electric Lighting; and I do hereby declare that the following is a full and exact description of the same, reference being had to the accompanying drawings, and to the letters of reference marked thereon.

This invention relates to a system of laying the conductors conveying the current from a central station or source of electric energy throughout a system of electric lighting or translation.

Where many translating devices, converting electricity into either power or light, are arranged upon the multiple-arc or derived-circuit system, it is essential that, so far as possible, an equal electro-motive force or pressure be maintained in all parts of the system. When, however, each set of conductors is run out from the central station in a straight line, or in lines, the pressure, when a number of devices are in operation, is apt to be greatest nearest the central station, and to diminish gradually toward the end of the conductors.

The object of this invention is to obviate such danger and to maintain practically throughout the entire system an equal pressure; and to this end it consists in the features more particularly hereinafter set forth and claimed.

Figure 1:
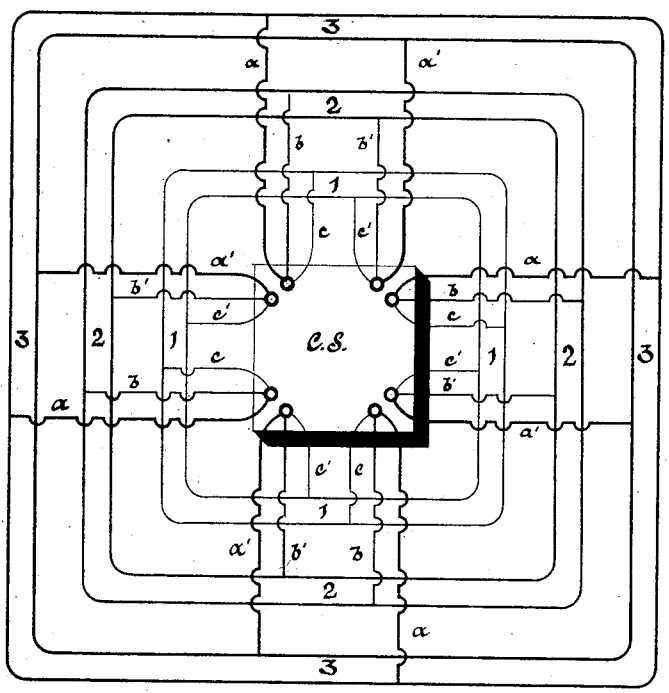
Figure 2:
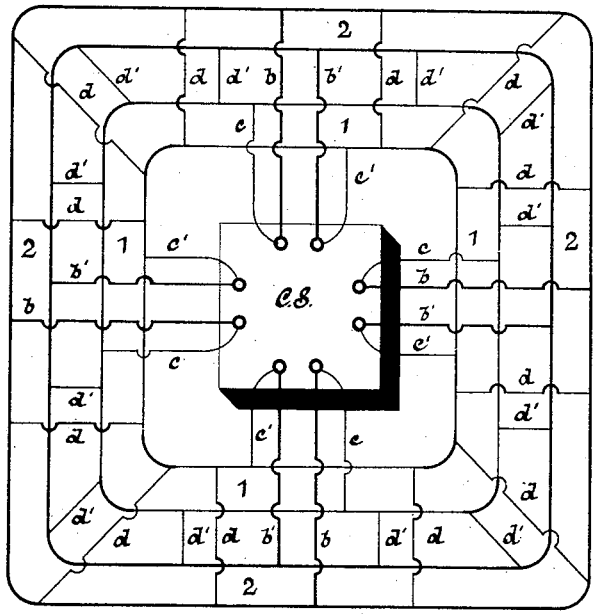

In the drawings, Figures 1 and 2 are diagrams illustrating the method of arranging the conductors.

C S is the central station, around which, following the general direction of the blocks or squares of the locality, are laid the sets of conductors 1, 2, 3, &c., so that they are, so to speak, concentric with each other. From the central station branch conductors lead to each of the main sets 1 2 3 at a number of points. For instance, $a\ a'$ lead to set 3, $b\ b'$ to 2, $c\ c'$ to 1. In Fig. 1 eight sets of branch conductors are shown leading to each of the main sets. In Fig. 2 two sets of main conductors, 1 2, are shown connected to the main station by four sets each of branch conductors, $b\ b'\ c\ c'$, differing, however, from Fig. 1 in that the main sets 1 2 are connected together by numerous sets of coupling-conductors, $d\ d'$. As proceeding from the central station, each set of main conductors traverses a larger area of territory and has a larger amount of work to do. If all of the conductors were of the same size, there would be increased resistance. It is desirable, however, that each (no lamps on branch conductors or couplers) set should be of the same resistance, and that the same ratio of resistance of conductor to translating device should exist in all the sets. This is accomplished by increasing the size of the conductors as they are laid farther away from the central station. Having determined the relative resistance which should exist between the resistance of the conductors and that of the sum of translating devices most probably to be used with such conductors, the increase of size to be given is that which shall preserve such ratio, taking into consideration the increased length of conductor and the increased number of devices to be probably supplied thereby. By this method of laying and uniting the conductors an equal pressure or electro-motive force may be maintained throughout an entire system.

What I claim is—

1. The method of laying the conductors in an electrical-supply system, consisting in laying them in sets concentrically, as explained, each set being connected to the central station at several points, substantially as set forth.

2. The method of laying the conductors in an electrical-supply system, consisting in laying them in sets concentrically, as explained, each set being connected to the central station by several sets of branch conductors, and the various sets being connected to each other by several sets of coupler-conductors, substantially as set forth.

This specification signed and witnessed this 31st day of July, 1880.

THOS. A. EDISON.

Witnesses:
WM. CARMAN,
S. L. GRIFFIN.